United States Patent Office 3,544,597
Patented Dec. 1, 1970

3,544,597
PROCESS FOR MANUFACTURING
SULFONATED AMIDES
Harrison S. Killam, Holland, Pa., assignor to Rohm and
Haas Company, Philadelphia, Pa., a corporation of
Delaware
No Drawing. Continuation-in-part of application Ser. No.
550,600, May 17, 1966. This application June 12, 1969,
Ser. No. 832,831
Int. Cl. C07c *143/14, 143/56;* C07d *63/04*
U.S. Cl. 260—332.1                                  5 Claims

ABSTRACT OF THE DISCLOSURE

This invention is for a process of preparing lower alkyl- and olefinic-amido-sulfonic acids. A nitrile, olefin and fuming sulfuric acid are sequentially mixed together at a temperature of between —30° and 45° C. The SO₃ content of the fuming H₂SO₄ may vary from a catalytic amount to about 0.5 mol/mol of olefin, and in any event must be substantially less than an equimolar amount with reference to the olefin. The process results in the formation of sulfonated amides which are insoluble in an excess of the nitrile employed as the sole solvent, the amides being obtained directly by filtration and in a high state of purity.

This application is a continuation-in-part of my application Ser. No. 550,600 which was filed on May 17, 1966 and has now been abandoned.

This invention relates to a new process for manufacturing known β-sulfonated alkyl amides such as are shown by the following formula:

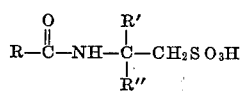

wherein R is derived from an organic nitrile, RCN, and is a member selected from the group consisting of H, lower alkyl, lower alkenyl and chloro methyl; R' and R'' are each derived from an olefinic compound

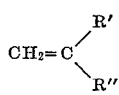

where R' and R'' have the values set forth below, namely R' is a member selected from the group consisting of H, a $C_1$–$C_{16}$ alkyl group and chloro methyl, and R'' is a member selected from the group consisting of H, a $C_1$–$C_{16}$ alkyl group, phenyl, and halogen-substituted phenyl, and the combined total of C atoms in R' and R'' ranges from 2 to 16.

Another type of β-sulfonated alkyl amide which can be made in accordance with the present invention is shown by the following formula:

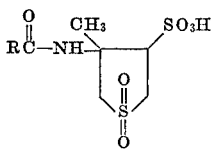

wherein R is as defined above, and the olefinic compound employed is 3-methyl sulfolene which has the following structure:

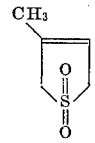

More particularly, this invention concerns a process for manufacturing the above-identified products, which is characterized by mixing an excess of a nitrile with an olefin at a relatively low temperature, preferably —30 to 45° C., and adding fuming sulfuric acid to the mixture while maintaining the same temperature range until the reaction is completed. (By fuming sulfuric acid—also referred to as oleum—is meant concentrated sulfuric acid which contains a specific quantity of sulfur trioxide. Thus 30% oleum is sulfuric acid which contains 30% sulfur trioxide by weight.) The product precipitates as a solid and can be conveniently collected by filtration, centrifugation or any other conventional procedure for separating solids from solvents. Equally favorable results are obtained if the acid is mixed with the nitrile and then the olefin added to this solution. The process is shown below:

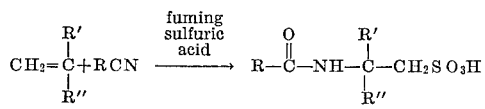

The products made by this process are very diverse in nature and are useful in many areas, such as components in copolymer formulations designed for coating applications, as stabilizers for polyacrylonitrile dispersions, as foam stabilizers in hand dish washing formulations where a high stable foam is necessary, etc. Amino sulfonic acids, readily obtained by hydrolysis of the amides, are also useful as systemics, an example being aminobutane sulfonic acid which has been found to be effective as a viral antimetabolite. Other examples of compounds made by the inventive process include numerous sulfonated amides, such as 2-acrylamido-2-phenylethane-1-sulfonic acid and 2-acylamidodecyl-1-sulfonic acid, which are useful for incorporation of dye-receptive sites into fiber-forming polymers.

More in detail, the products which are readily available as a result of this invention have utility in the fields mentioned below. They are very efficient foam builders, and foam stabilizers. They are useful for the preparation of high-softening, dyeable modacrylic textile articles which have increased receptiveness to dyes because of the incorporation of acrylamidosulfonic acids. Data concerning the manner in which this particular utility can be obtained are set forth in more detail in Canadian Pat. 704,778, said data being incorporated herein by reference.

Further, the higher molecular weight compounds of this invention, where the alkyl group to which the sulfonic acid is attached contains from 10 to 20 carbon atoms, are outstanding lime soap dispersants. When the number of carbon atoms is lower, for example, from 4 to 10, the compounds are useful as wetting agents and dispersants in water slurries of inorganic and organic materials, such as cement, kaolin, coal, oil well drilling muds and the like. Data concerning the manner in which this particular utility can be obtained from the composition are set forth in more detail in U.S. Pat. 3,235,549, said data being incorporated herein by reference.

With reference to methods of synthesizing sulfonated amides similar to the subject matter of the present invention, Canadian Pat. No. 704,778 discloses that acrylamido sulfonic acid compounds can be produced by reacting an aliphatic nitrile with a terminal mono-olefin compound, in the presence of a sulfonating agent comprised of a mixture of sulfuric acid and acid anhydride containing at least about two moles of acetic anhydride per mole of sulfuric acid. The process of the present invention, by comparison, utilizes a different sulfonating agent, and only about 1 mole thereof is required.

Further, with reference to the prior art, U.S. Pat. 3,235,549 relates to the preparation of novel heterocyclic compounds, one important use for which is an intermediate in the manufacture of valuable surface active agents. Disclosed in that patent is a process for the use of the compounds of that invention which utilizes sulfur trioxide as the sulfonating agent. The sulfur trioxide is in some complexed form and in at least an equimolar amount to the olefin. In fact, as the patentee expressly states, an excess of $SO_3$ over the theoretical stoichiometric amount is utilized in the sulfonation reaction in order to drive the reaction to as complete a level as is practical or possible in a relatively short time. By contrast, the amount of $SO_3$ employed in the present invention must in every case be substantially less than a stoichiometric amount or else compounds are formed which are other than the above-defined β-sulfonated alkyl amides. In fact, in some cases only a catalytic amount of $SO_3$ can be employed in the present invention and still provide a high yield of pure β-sulfonated alkyl amide product.

As thus indicated, the ratio of $SO_3$ to olefin, particularly the use of substantially less than a stoichiometric amount of $SO_3$, is critical to the present invention. In each of the 19 examples set forth below to illustrate the present invention it will be noted that the ratio of mols of $SO_3$ to mols of olefin is substantially less than equimolar, to wit see Table I which follows:

TABLE I

| Example No. | Mole $SO_3$ | Mole olefin |
|---|---|---|
| I | 0.37 | 1.0 |
| II | 0.5 | 1.0 |
| III | 0.5 | 1.0 |
| IV | 0.13 | 0.3 |
| V | 0.037 | 0.1 |
| VI | 0.18 | 0.5 |
| VII | 0.156 | 0.4 |
| VIII | 0.6 | 0.8 |
| IX | 0.11 | 0.3 |
| X | 0.5 | 1.0 |
| XI | 0.0075 | 0.1 |
| XII | 0.156 | 0.4 |
| XIII | 0.062 | 0.2 |
| XIV | 0.1 | 0.4 |
| XV | 0.062 | 0.2 |
| XVI | 0.2 | 0.5 |
| XVII | 0.39 | 1.0 |
| XVIII | 0.2 | 0.5 |
| XIX | 0.11 | 0.4 |

TABLE II

| Reactants: | | | | |
|---|---|---|---|---|
| Olefin | $CH_3C(CH_3)=CH_2$ | $CH_3(CH_2)_{11}CH=CH_2$ | $CH_3C(CH_3)=CH_2$ | $CH_3(CH_2)_{13}CH=CH_2$ |
| Nitrile | $CH_3CN$ | $CH_3CN$ | HCN | $CH_2=CHCN$ |

Product:

When $SO_3$ reacted with olefin and nitrile (as per U.S. Patent 3,235,549).

When $H_2SO_4$ is reacted with olefin and nitrile (as per U.S. Patent 2,573,673).

When fuming $H_2SO_4$ is reacted with olefin and nitrile (as per present invention):
product $CH_3C(O)-NH-CH(CH_3)-CH_2SO_3H$ ; $CH_3C(O)-NH-CH((CH_2)_{11}CH_3)-CH_2SO_3H$ ; $HC(O)-NH-CH(CH_3)_2-CH_2SO_3H$ ; $CH_2=CHC(O)-NH-CH((CH_2)_{13}CH_3)-CH_2SO_3H$ Note.—The products in each vertical column are formed be reaction of $SO_3$, or $H_2SO_4$, or fuming $H_2SO_4$ with the respective olefin and nitrile listed at the top of the column. The differences in the products formed can be noted, in proceeding downwards in each column, the differences being caused by the respective sulfonating agents employed.

Another important distinction over the invention disclosed in U.S. Pat. 3,235,549 is that the process of that patent requires two separate steps to form the sulfonated amide, whereas the present invention accomplishes the same objective in a single step, thereby simplifying the isolation of pure products and likewise avoiding the likelihood of undesirable side reactions taking place.

Advantages of this invention will further become apparent from the details set forth hereinafter including the data in Table II. In this table a comparison is made of the case where fuming $H_2SO_4$ is employed as the reactant, pursuant to the present invention, as opposed to cases where other sulfur-containing reactants are employed such as $SO_3$ (disclosed in U.S. Pat. 3,235,549) and $H_2SO_4$ (disclosed in U.S. Pat. 2,573,673).

The invention of the present instance is amply illustrated by the following examples which indicate the variety and diverse quantities of reactants which can be employed as well as the various concentrations of fuming sulfuric acid required. It will be noted that the concentrations of fuming $H_2SO_4$ employed vary from 6 to 65%. Further, as the results of elemental analyses, nuclear magnetic resonance spectroscopy data, and infra-red analyses clearly show, none of the compounds produced by the process of the present invention in the examples in any way resembles the compounds disclosed in U.S. Pat. 3,235,549 where the use of fuming sulfuric acid was disclosed as a source of $SO_3$ for reaction with an olefin and an organic nitrile. These facts emphasize the critical importance of the present applicant's discovery that use of substantially less than a stoichiometric amount of $SO_3$ will produce compounds entirely and distinctly different than those produced when the theoretical stoichiometric or an exces amount thereof is used as per the disclosure in U.S. 3,235,549.

EXAMPLE 1

To a solution of 400 g. of acrylonitrile and 56 g. (1.0 mol) of isobutylene maintained at −20 to −30° C. was added, over a period of 20 minutes, 100 g. of 30% oleum. The temperature was kept below −20° C. for one hour, then the mixture was allowed to warm to room temperature. In approximately two hours, a dense white solid had formed. The mixture was stirred overnight and filtered. The solid was washed with cold acetonitrile and dried. Yield of product was 177 g. (85.5%);

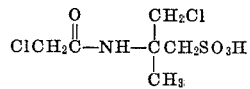

M.P. 200–202° C. with decomposition.

*Analysis.*—Calculated (percent): N, 6.77; S, 15.4. Found (percent): N, 6.66; S, 15.17.

EXAMPLE 2

To a solution of 350 g. of acetonitrile and 168 g. (1.0 mol) dodecene-1 was added 100 g. of 40% oleum. The temperature was kept at −20 to −10° C. during the 30 minute addition period and for 1 hour after. The mixture was then allowed to warm to room temperature and stirring was continued for another 16 hours. The solid was washed with cold acetonitrile and dried. Yield of product was 164 g. (54%).

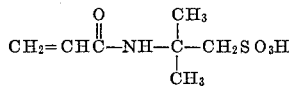

EXAMPLE 3

The same reaction components and conditions were used as in Example 2 above, except that the order of dodecene-1 and oleum addition was reversed. In this instance, the product yield was slightly higher (56%).

EXAMPLE 4

To a mixture of 130 g. (1.45 mol) chloroacetonitrile was added 27 g. (0.3 mol) methallyl chloride. The solution was stirred at 15 to 25° C. while 35 g. of 30% oleum was added in 30 minutes. The reaction was allowed to proceed for 7 hours and then the white solid was collected. Yield of product was 56 g. (67.5%); M.P. 133–134° C.

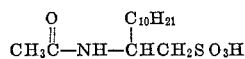

EXAMPLE 5

A mixture of 165 g. (3.0 mol) propionitrile and 13.8 g. (0.1 mol) p-chlorostyrene was stirred at 5–10° C. while 10 g. of 30% oleum was added dropwise in 10 minutes. After stirring at 5 to 10° C. for 2 hours, the reaction mixture was allowed to warm to room temperature. Stirring was continued for an additional 4 hours. To facilitate collection of the solid, 100 ml. of cold acetonitrile was added and the white powder was collected on a filter and dried. In this manner, 27.5 g. (95%) of

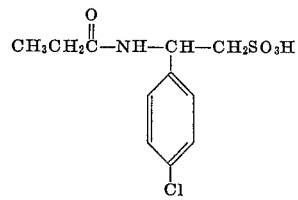

was obtained.

EXAMPLE 6

A mixture of 530 g. (10 mol) acrylonitrile and 69 g. (0.5 mol) p-chlorostyrene was treated with 50 g. of 30% oleum as described in Example 5. The yield of product was 113 g. (78%).

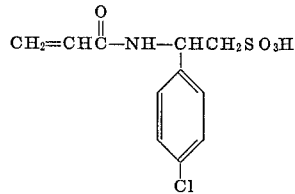

EXAMPLE 7

To a mixture of 134 g. (2.0 mol) methacrylonitrile and 78 g. (0.4 mol) tetradecene-1 was added, over a period of 45 minutes, 45 g. of 30% oleum. The temperature was kept at 10–15° C. during the addition and then it was allowed to increase to room temperature for a 13 hour reaction period. The product melted at 134–137° C. with decomposition.

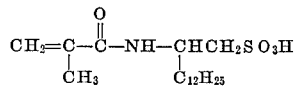

EXAMPLE 8

A mixture of 400 g. (7.55 mol) acrylonitrile and 157 g. (0.8 mol) tetradecene-1 was stirred at 0–5° C. while 75 g. of 65% oleum was added slowly. When addition was complete, the mixture was stirred at room temperature for 12 hours. The white solid

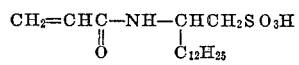

was collected on a filter. The yield was 94 g.; M.P. 129–131° C.

*Analysis.*—Calculated (percent): N, 4.04; S, 9.22. Found (percent): N, 3.90; S, 9.27.

EXAMPLE 9

A mixture of 154 g. (2.8 mol) propionitrile and 59 g. (0.3 mol) tetradecene-1 was cooled at 15 to 20° C. in a water bath while 30 g. of 30% oleum was added dropwise. After a 20 hour reaction period, the white solid, M.P. 143–146° C., was collected on a filter. The yield of product was 52 g. (50%).

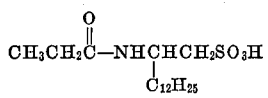

EXAMPLE 10

Acetonitrile, 410 g. (10 mol), was cooled to −35° C. and 56 g. (1.0 mol) isobutylene was added. The mixture was held at −30 to −20° C. while 100 g. of 40% oleum was added dropwise. The cooled mixture was allowed to warm to room temperature over a period of 3 hours, then stirred an additional 12 hours. The dense white solid was collected on a filter and dried. The product weighed 156 g. (80%); M.P. 201–202° C.

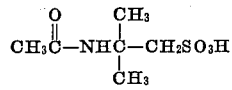

*Analysis.*—Calculated (percent): N, 7.18; S, 16.4. Found (percent): N, 7.04; S, 16.36.

EXAMPLE 11

To a mixture of 13.2 g. (0.1 mol) of 3-methyl sulfolene

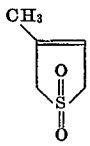

and 62 g. (1.5 mol) acetonitrile was added 10 g. of 6% oleum. The temperature during the addition was held at 10–15° C., while that of the 15 hour reaction period was 20–25° C. The product melted above 260° C. The yield of product was

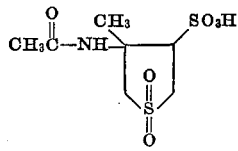

25.5 g. (94%) and was isolated in the usual manner.

EXAMPLE 12

A mixture of 110 g. (2.0 mol) propionitrile and 100 g. (0.4 mol) octadecene-1 was stirred at 15–20° C. while 45 g. of 30% oleum was added in 15 minutes. Stirring was continued for 16 hours, during which time the mixture partially solidified. Acetonitrile was then added and the white solid was collected on a filter. The product

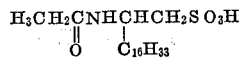

weighed 100 g.

EXAMPLE 13

To a mixture of 11.2 g. (0.2 mol) of isobutylene and 70 g. hydrocyanic acid stirred at −15 to −20° C. was added, dropwise, 25 g. of 20% oleum. The temperature was kept below 0° C. for about 3 hours, then allowed to rise slowly to room temperature. The total reaction time was 22 hours. In order to induce precipitation of the product,

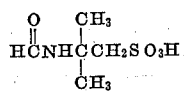

M.P. 184–186° C., it was necessary to remove a portion of the excess nitrile by application of vacuum. The identity of the compoupnd was confirmed by nuclear magnetic resonance spectroscopy and infrared analysis.

EXAMPLE 14

To a cooled solution of 40 g. (0.4 mol) styrene and 164 g. (4.0 mol) acetonitrile was added, dropwise, 40 g. of 20% oleum. The temperature was kept below 35° C. by application of a cooling bath. After 7 hours, the powdery white product was collected on a

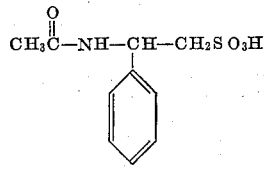

filter and dried. The yield of product, M.P. 216–218° C., was 60 g. (63%).

EXAMPLE 15

A mixture of 82 g. (2.0 mol) acetonitrile and 18 g. (0.2 mol) methallyl chloride was cooled to 10° C. To this solution was added 25 g. of 20% oleum and the rather vigorous exotherm was kept below 30–35° C. by cooling. After 5 hours, the white solid was collected and dried. The product melts with decomposition at

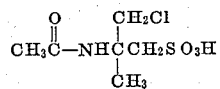

217–219° C. The yield was 36 g. (79%).

*Analysis.*—Calculated (percent): N, 6.12; S, 13.95; Cl, 15.30. Found (percent): N, 6.04; S, 14.07; Cl, 15.06.

EXAMPLE 16

A mixture of 42 g. (0.5 mol) hexene-1 and 80 g. (1.5 mol) acrylonitrile was cooled at 10–15° C. while 55 g. of 30% oleum was added in 25 minutes. The temperature was allowed to reach room temperature over a period of several hours and then the mixture was stirred overnight. The white powdery product was

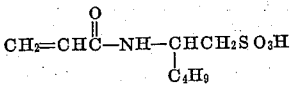

collected in the usual manner.

EXAMPLE 17

A mixture of 400 g. acrylonitrile, 98 g. (0.5 mol) tetradecene-1, and 112 g. (0.5 mol) hexadecene-1 was stirred at 15–20° C. while 105 g. of 30% oleum was added in 15 minutes. After a suitable reaction period, the product, a mixture of

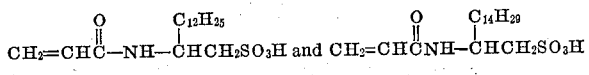

was collected in the usual manner. The white powder amounted to 122 g. (33%) and melted over a considerable range.

EXAMPLE 18

A mixture of 84 g. (0.5 mol) dodecene-1 and 110 g. (2.1 mol) acrylonitrile was treated with 55 g. of 30% oleum as described in Example 16. The product

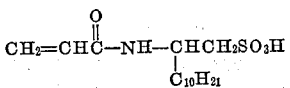

weighed 32 g.

EXAMPLE 19

To a mixture of 81 g. (2.0 mol) acetonitrile and 79 g. (0.4 mol) tetradecene-1 cooled in an ice water bath was added in 15 minutes 45 g. 20% oleum. The rapid exotherm was kept below 45° C. during the addition. After several hours a white solid separated. The mixture was stirred overnight, then filtered. The white solid,

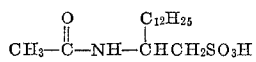

amounted to 71 g. (53%). Additional product along with various alkyl sulfonates was obtained by evaporation of the filtrate and conversion to the sodium salt. These water soluble products gave very high stable foams.

I claim:

1. A process for manufacturing sulfonated amides having the formula

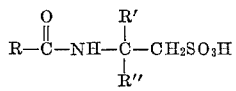

in which R is derived from an organic nitrile RCN and is a member selected from the group consisting of H, lower alkyl, lower alkenyl and chloro methyl, R' and R'' each being derived from an olefinic compound

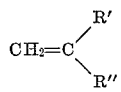

where R' and R'' have the values set forth below, namely R' is a member selected from the group consisting of H, a $C_1$–$C_{16}$ alkyl group and chloro methyl, and R'' is a member selected from the group consisting of H, a $C_1$–$C_{16}$ alkyl group, phenyl and halogen-substituted phenyl, and the combined total of C atoms in R' and R'' ranges from 2 to 16, characterized by treating at a reaction temperature between —30 and 45° C. an excess of the nitrile material and the olefinic compound with fuming sulfuric acid whose sulfur trioxide content is substantially less than an equimolar amount with reference to the olefin.

2. The process of claim 1 in which the fuming sulfuric acid employed contains up to about 65% $SO_3$.

3. The process of claim 1 in which the nitrile and the olefin are mixed together, and the fuming sulfuric acid is added while maintaining the temperature of the reaction between —30 and 45° C., the N-substituted amide separating as a solid which then is recovered.

4. The process of claim 1 in which the nitrile and fuming sulfuric acid are mixed together, and the olefin is added while maintaining the temperature between —30 and 45° C., the N-substituted amide separating as a solid which then is recovered.

5. A process of manufacturing sulfonated amides having the formula

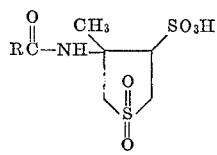

in which R is derived from an organic nitrile RCN and is a member selected from the group consisting of H, lower alkyl, lower alkenyl and chloro methyl, characterized by treating at a reaction temperature between —30 and 45° C. an excess of the nitrile material and 3-methylsulfolene with fuming sulfuric acid whose sulfur trioxide content is substantially less than an equimolar amount with reference to the olefin.

References Cited

UNITED STATES PATENTS 3,235,549   2/1966   Broussalian _____ 260—243

HENRY R. JILES, Primary Examiner

C. M. SHURKO, Assistant Examiner

U.S. Cl. X.R.

106—287; 252—350, 351, 117; 260—507, 513, 88.7; 424—317